(12) United States Patent
Kim et al.

(10) Patent No.: US 11,346,992 B2
(45) Date of Patent: May 31, 2022

(54) LIGHT UNIT, MANUFACTURING METHOD THEREOF AND DISPLAY DEVICE COMPRISING THE SAME

(71) Applicant: Samsung Display Co., LTD., Yongin-si (KR)

(72) Inventors: Chang Ok Kim, Hwaseong-si (KR); Chui Min Bae, Hwaseong-si (KR); Ji Hye Han, Seoul (KR); Tae Wook Kang, Seongnam-si (KR); Yong Seok Kim, Seoul (KR); Shin Il Choi, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/714,763

(22) Filed: Dec. 15, 2019

(65) Prior Publication Data
US 2020/0233136 A1    Jul. 23, 2020

(30) Foreign Application Priority Data
Jan. 22, 2019 (KR) .......................... 10-2019-0008156

(51) Int. Cl.
*F21V 8/00* (2006.01)
(52) U.S. Cl.
CPC ........... *G02B 6/0003* (2013.01); *G02B 6/005* (2013.01); *G02B 6/0026* (2013.01); *G02B 6/0065* (2013.01); *G02B 6/0073* (2013.01)
(58) Field of Classification Search
CPC .... G02B 6/0003; G02B 6/0026; G02B 6/005; G02B 6/0065; G02B 6/0073
See application file for complete search history.

(56) References Cited

U.S. PATENT DOCUMENTS

| 9,896,378 | B2 | 2/2018 | You et al. | |
|---|---|---|---|---|
| 2003/0147024 | A1* | 8/2003 | Wang | G02F 1/133621 349/61 |
| 2004/0114067 | A1* | 6/2004 | Kubomura | G02B 6/0055 349/62 |
| 2005/0095514 | A1* | 5/2005 | Lee | G03F 7/0007 430/7 |
| 2011/0002589 | A1* | 1/2011 | Ho | G02B 6/001 385/123 |
| 2012/0140513 | A1* | 6/2012 | Shibata | G02F 1/133615 362/602 |

(Continued)

FOREIGN PATENT DOCUMENTS

| KR | 10-0503151 | 7/2005 |
|---|---|---|
| KR | 10-2011-0038472 | 4/2011 |
| KR | 10-2017-0019019 | 2/2017 |

*Primary Examiner* — Bryon T Gyllstrom
*Assistant Examiner* — Christopher E Dunay
(74) *Attorney, Agent, or Firm* — H.C. Park & Associates, PLC

(57) ABSTRACT

A light unit including: a light source; and an optical member that transmits and converts light emitted from the light source, wherein the optical member includes: a light guide; a low refractive index layer that is disposed on the light guide and has a lower refractive index than that of the light guide; a first capping layer that is disposed on the low refractive index layer; and a wavelength conversion layer that is disposed on the first capping layer and includes quantum dots, and the light guide includes a transparent metal oxide.

10 Claims, 15 Drawing Sheets

(56) References Cited

U.S. PATENT DOCUMENTS

| | | | | |
|---|---|---|---|---|
| 2014/0218967 A1* | 8/2014 | Kuroki | ................ | G02B 6/0003 362/612 |
| 2018/0106948 A1* | 4/2018 | Wong | ................... | G02B 6/0088 |
| 2020/0218005 A1* | 7/2020 | Ahn | ..................... | G02B 6/0055 |
| 2020/0264461 A1* | 8/2020 | Kuwana | .................. | G02B 5/20 |

* cited by examiner

LIGHT UNIT, MANUFACTURING METHOD THEREOF AND DISPLAY DEVICE COMPRISING THE SAME

CROSS REFERENCE TO RELATED APPLICATION

This application claims priority from and the benefit of Korean Patent Application No. 10-2019-0008156, filed on Jan. 22, 2019, which is hereby incorporated by reference for all purposes as if fully set forth herein.

BACKGROUND

Field

Exemplary embodiments of the invention relate generally to a light unit, a method for manufacturing the light unit, and a display device including the light unit.

Discussion of the Background

A liquid crystal display (LCD) includes a display panel in which a light crystal layer is charged between two substrates. The liquid crystal display controls an orientation of light crystal molecules of the light crystal layer to adjust transmittance of light by a pixel unit, thereby displaying an image. Since the display panel of the liquid crystal display is a light receiving element with a non-emission property, the liquid crystal display includes a light unit for providing light to the display panel on the bottom of the display pane.

The light unit may include a light source such as a light emission diode (LED) and an optical member for uniformly transmitting light emitted from the light source to the display panel. Recently, a method of applying quantum dots to the light unit has been developed. When the quantum dots are applied, a wide color area can be provided and color reproducibility can be improved. In addition, there are various advantages such as a high peak luminance can be obtained and power consumption can be reduced. However, luminance may decrease over time.

The above information disclosed in this Background section is only for understanding of the background of the inventive concepts, and, therefore, it may contain information that does not constitute prior art.

SUMMARY

Devices constructed according to exemplary embodiments of the invention are capable of providing a light unit having an improved optical property and a display device including the light unit, and exemplary methods provide a method for manufacturing the light unit.

Additional features of the inventive concepts will be set forth in the description which follows, and in part will be apparent from the description, or may be learned by practice of the inventive concepts.

A light unit according to an exemplary embodiment includes: a light source; and an optical member that transmits and converts light emitted from the light source, wherein the optical member includes: a light guide; a low refractive index layer that is disposed on the light guide and has a lower refractive index than that of the light guide; a first capping layer that is disposed on the low refractive index layer; and a wavelength conversion layer that is disposed on the first capping layer and includes quantum dots, and the light guide includes a transparent metal oxide.

The metal oxide may include at least one of Fe, Ti, Co, Cr, Zn, Zr, Sn, V, Mg, Al, Sr, Mn, Cu, and Ni.

The metal oxide may include: a transparent first metal oxide; and a second metal oxide that represents a predetermined color, and a content of the first metal oxide may be greater than a content of the second metal oxide.

The light guide may have transmittance of over 70% within a wavelength range of 400 nm to 700 nm with respect to a direction that is perpendicular to a side surface of the light guide.

The optical member may further include a second capping layer that is disposed on the wavelength conversion layer, and the first capping layer and the second capping layer may include an inorganic material.

The optical member may further include an overcoat layer that is disposed on the second capping layer, wherein the overcoat layer may include an organic material.

A display device according to an exemplary embodiment includes: a display panel; and a light unit that supplies light to the display panel, wherein the light unit includes a light source and an optical member that transmits and converts light emitted from the light source, the optical member includes a light guide, a low refractive index layer that is disposed on the light guide and has a lower refractive index than that of the light guide, and a first capping layer that is disposed on the low refractive index layer, the light guide includes a transparent first metal oxide and a second metal oxide that represents a predetermined color, and a content of the first metal oxide is greater than a content of the second metal oxide.

The light guide may have transmittance of over 70% within a wavelength range of 400 nm to 700 nm with respect to a direction that is perpendicular to a side surface of the light guide.

The first metal oxide and the second metal oxide may include the same metal.

The first metal oxide and the second metal oxide may include at least one of Fe, Ti, Co, Cr, Zn, Zr, Sn, V, Mg, Al, Sr, Mn, Cu, and Ni.

The optical member may further include: a wavelength conversion layer that is disposed on the first capping layer; and a second capping layer that is disposed on the wavelength conversion layer and includes an inorganic material.

The optical member may further include an overcoat layer that is disposed on the second capping layer, and the overcoat layer may include an organic material.

A method for manufacturing a light unit, according to an exemplary embodiment includes: preparing a light guide that includes a glass material; thermal treatment the light guide; forming a low refractive index layer on the light guide; and forming a first capping layer on the low refractive index layer by using a plasma-assisted chemical vapor deposition method.

The thermal treatment may be carried out at 150° C. to 350° C.

The thermally treating the light guide may be carried out before forming the refractive index layer.

The thermally treating the light guide may be carried out after forming the refractive index layer.

The thermally treating the light guide may be carried out at 200° C. or less.

As a temperature of the thermal treatment of the light guide is increased, thermal treatment time may be shortened.

The thermally treated light guide may include a metal oxide, the metal oxide may include a transparent first metal oxide and a second metal oxide having a predetermined color, and a content of the first metal oxide may be greater than a content of the second metal oxide in the light guide.

The thermally treated light guide may have transmittance of over 70% within a wavelength range of 400 nm to 700 nm with respect to a direction that is perpendicular to a side surface of the light guide.

A method for manufacturing a light unit according to an exemplary embodiment includes: preparing a light guide that includes a glass material; irradiating light to the light guide; and forming a low refractive index layer and a first capping layer on the light guide, wherein the light has a wavelength of over 400 nm.

The method for manufacturing the light unit may further include preparing a light source that faces one side of the light guide, wherein the light may be emitted from the light source.

The light guide to which light is irradiated may include a metal oxide, the metal oxide may include a transparent first metal oxide and a second metal oxide that represents a predetermined color, and a content of the first metal oxide may be greater than a content of the second metal oxide in the light guide.

The light-irradiated light guide may have transmittance of over 70% within a wavelength range of 400 nm to 700 nm with respect to a direction that is perpendicular to a side surface of the light guide.

According to the exemplary embodiments, a light unit having an improved optical property, a method for manufacturing the light unit, and a display device including the light unit can be provided. In particular, it is possible to provide a light unit in which luminance of a light facing portion does not change or hardly changes even after a lapse of time.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
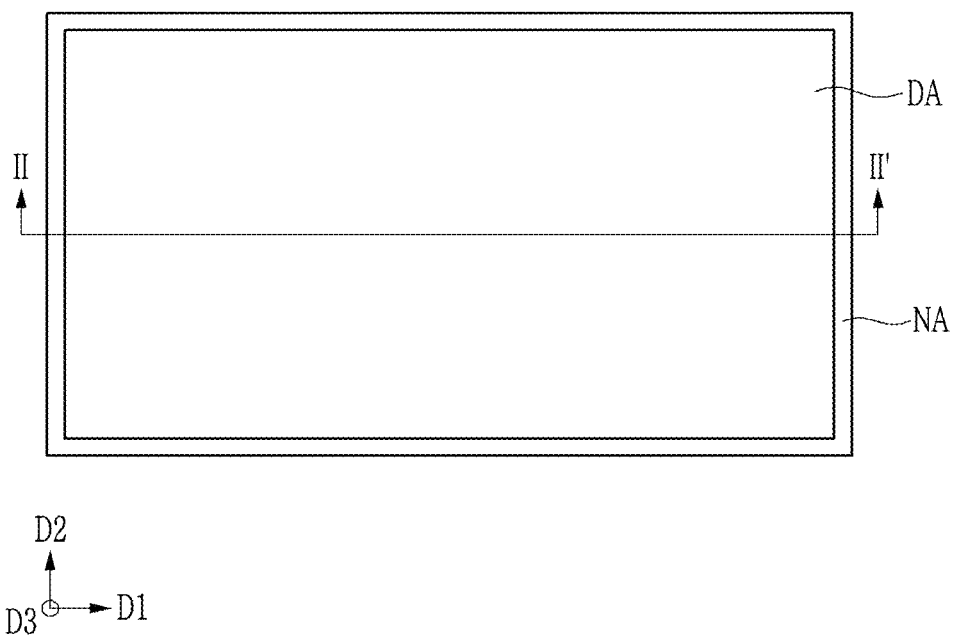
FIG. 1 schematically illustrates a display device according to an exemplary embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

In addition, in this specification, the phrase "on a plane" means viewing a target portion from the top, and the phrase "on a cross-section" means viewing a cross-section formed by vertically cutting a target portion from the side.

Hereinafter, a display device including a light unit according to an exemplary embodiment will be described with reference to FIG. 1 to FIG. 3. FIG. 1 schematically illustrates a display device according to an exemplary embodiment, FIG. 2 is a cross-sectional view of FIG. 1, taken along the line and FIG. 3 is a cross-sectional view of an optical member according to the exemplary embodiment.

Referring to FIG. 1, a front side of a display device 1 is schematically illustrated. The display device 1 may be formed in the shape of a rectangle. A display area DA where an image that is displayed occupies almost the entire area of the front side of display device 1, and a non-display area NA surrounds the display area DA. The display area DA is called a screen, and the non-display area NA is called a bezel.

Although it is shown in the drawing that the display device 1 and the display area DA have four angular corners, but they may have rounded corners. In addition, the display device 1 according to the exemplary embodiment may have almost no non-display area NA.

Figure 2:
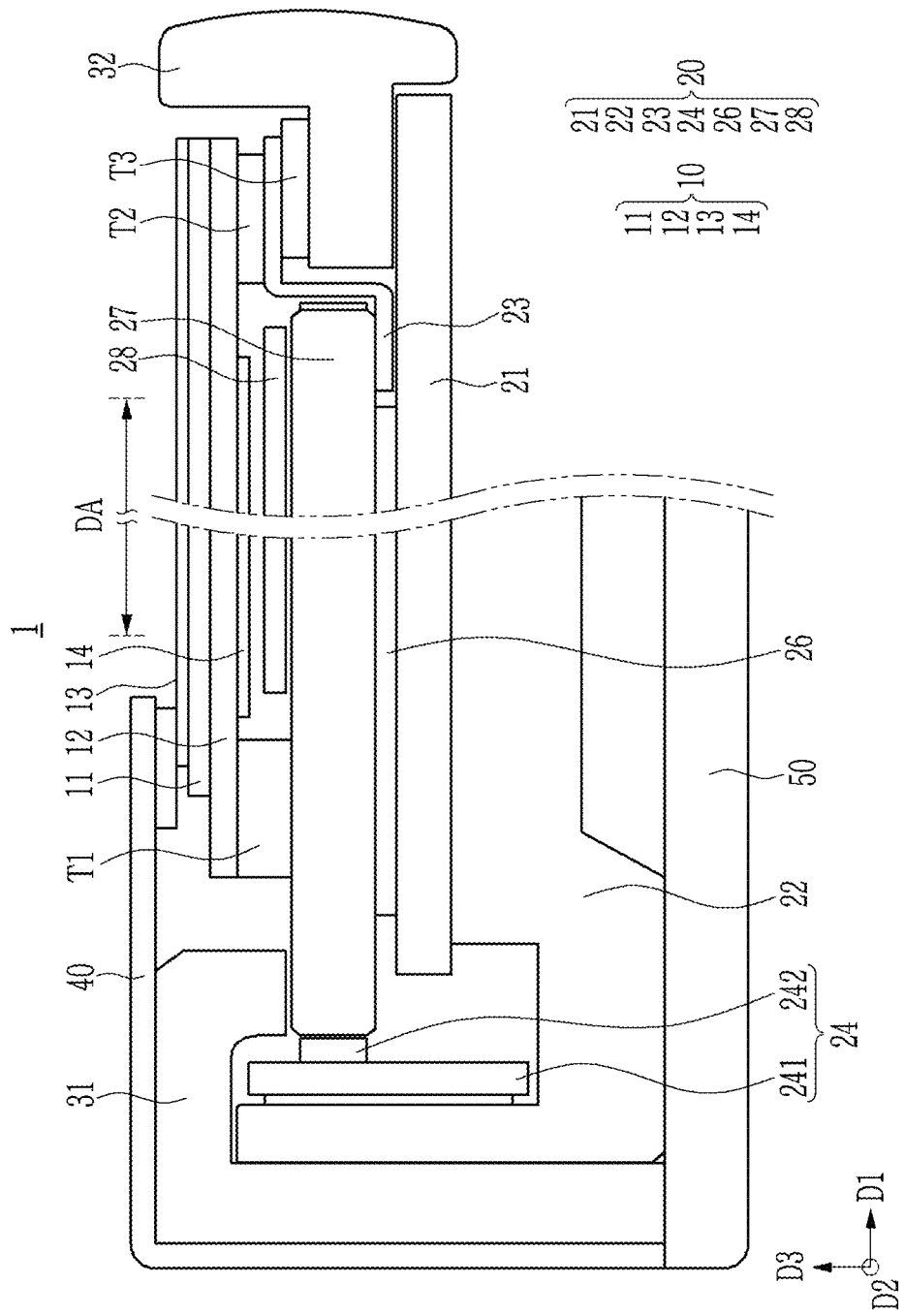
FIG. 2 is a cross-sectional view of FIG. 1, taken along the line II-Ir.
Figure 3:
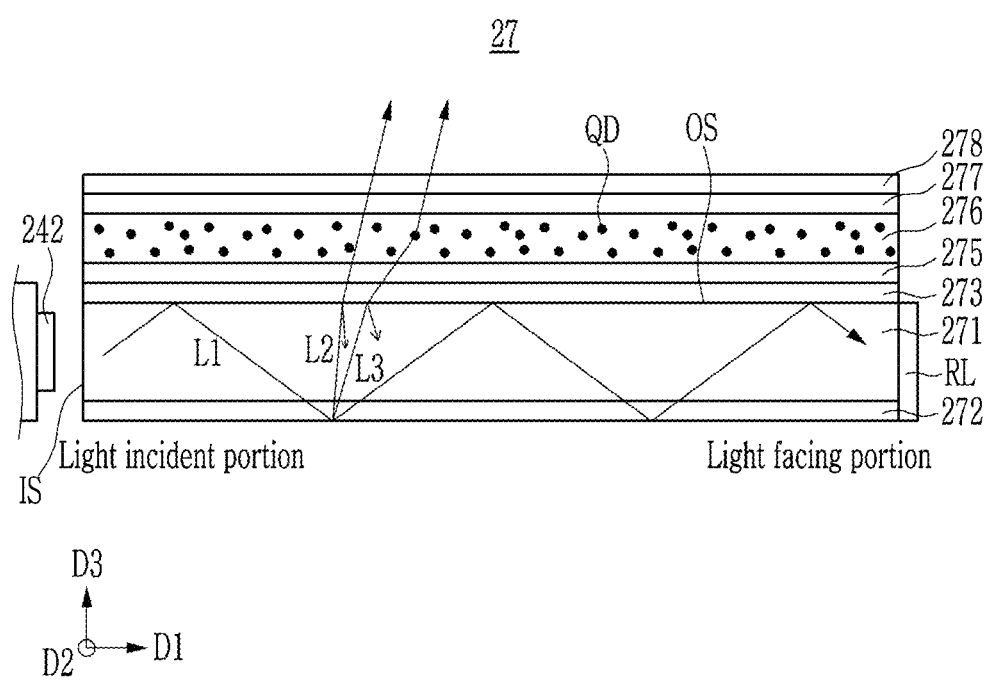
FIG. 3 is a cross-sectional view of an optical member according to the exemplary embodiment.

FIG. 2 illustrates a cross-section of the display device 1 shown in in FIG. 1, taken along a direction D1. Referring to FIG. 2, a light source unit 24 is disposed at one edge of the display device 1. In the display device 1, the periphery of an edge where the light source unit 24 is disposed is called a light incident portion, and the periphery of an edge at the opposite side of the light incident portion, in which the light source unit 24 is not disposed, is called a light facing portion. The light source unit 24 may be disposed at at least one edge of the display device 1, but may extend in a vertical direction at a left edge of the display device 1.

Referring to FIG. 1 and FIG. 2, the display device 1 basically includes a display panel 10 and a light unit 20. The display device 1 includes frames 31 and 32 that fix the display panel 10 to the light unit 20 between the display panel 10 and the light unit 20. The display device 1 includes a top chassis 40 that protects the display panel 10 while covering the edge of the display panel 10, and prevents the display panel 10 from being separated from the light unit 20. The top chassis 40 may be disposed only at the edge of the display device, in which the light source unit 24 is disposed, or may surround the edge of the display device 1. A back cover 50 that covers a driving device, a power device, and the like, which operate the display device 1, is disposed at a rear side of the light unit 20.

The display panel 10 may be a liquid crystal display panel where a liquid crystal layer is formed between two transparent substrates 11 and 12 where a switch, an electrode, and a color filter are formed. Polarizers 13 and 14 are respectively attached to surfaces of the substrates 11 and 12. The display panel 10 adjusts transmittance of light provided by the light unit 20 and passing through the polarizers 13 and 14 and the liquid crystal layer under control of the driving device and then displays an image.

The light unit 20 that supplies light to the display panel 10 is disposed below the display panel 10. The light unit 20 includes a bottom chassis 21, a support 22, a bracket 23, the light source unit 24, and optical elements 26, 27, and 28.

The bottom chassis 21 is a kind of container where constituent elements of the light unit 20 are placed or fixed. The bottom chassis 21 may be formed in the shape of a substantially rectangular tray and the like. The bottom chassis 21 may be formed of a metal material such as aluminum, an aluminum alloy, or a galvanized steel sheet. The bottom chassis 21 may be formed of a plastic material such as a polycarbonate.

The optical elements that include a reflective sheet 26, an optical member 27, and an optical sheet 28 are disposed on the bottom chassis 21. The support 22 to which the light source unit 24 is combined is disposed at a rear side of the bottom chassis 21 in the light incident portion. In the light facing portion, the bracket 23 that supports the optical member 27 is disposed on the bottom chassis 21.

The support 22 is a kind of heat dissipation part for fixing the light source unit 24, and at the same time, transmitting heat generated by the light source unit 24 to the bottom chassis 21. The support 22 may include a metallic material having good thermal conductivity to thereby prevent the light source unit 24 from being over-heated due to rapid transmittance of the heat from the light source unit 24 to the bottom chassis 21. For example, the support 22 may be formed by press-molding aluminum or an aluminum alloy.

The light source unit 24 includes a substrate 241 that extends along the light incident portion, and a light source 242 disposed with a predetermined gap in the substrate 241. The substrate 241 may be a printed circuit board (PCB), and particularly, may be a metal core printed circuit board (MCPCB). The substrate 241 may be fixed to the support 22. The light source 242 is electrically connected to a wiring of the substrate 241, receives power, converts electrical energy to light energy, and then emits the light energy. The light source 242 may be a light emitting diode (LED) package, and the LED may emit light of blue having high color purity. The blue light may imply light having a wavelength of about 440 nanometers to about 485 nanometers. For example, the LED may emit blue light having a peak wavelength of 445 nanometers to 450 nanometers, particularly, a peak wavelength of 447 nanometers. The light source 242 is disposed in a manner that a light emitting side thereof faces the optical member 27. In addition to the LED package, a point light source or a linear light source may be used as the light source 242.

The optical member 27 is disposed in the bottom chassis 21, while one edge thereof is disposed adjacent to the light source 242. The optical member 27 is used to transmit light emitted from the light source 242 to the display panel 10 by guiding the light to the display panel 10. The optical member 27 serves to change light having an optical distribution in the form of a point light source or a linear light source generated in the light source unit 24 into light having an optical distribution in the form of a surface light source for uniform light distribution. The optical member 27 also converts a wavelength of the light emitted from the light source 242. The optical member 27 may be larger than the display area DA when viewed from a front so as to provide light to the entire display area DA of the display device 1. The optical member 27 may be provided as a single part.

The reflective sheet 26 may be disposed below the optical member 27, that is, between the optical member 27 and the bottom chassis 21. The reflective sheet 26 reflects light that moves under the optical member 27 to control the light to move toward the display panel 10, thereby improving light efficiency.

The optical sheet 28 may be disposed above the optical member 27. The optical sheet 28 may include a diffuser sheet, a prism sheet, and a protecting sheet. The diffuser sheet is used to uniformly distribute luminance by scattering light from the optical member 27, that is, is used to make a planar light source having uniform brightness. The prism sheet adjusts a proceeding direction of light dispersed by the diffuser sheet such that the proceeding direction of the light becomes perpendicular to the display panel 10. The protecting sheet may be used to protect a prism of a prism sheet from scratches and the like. The protecting sheet may also function to spread the light to broaden a viewing angle that is narrowed by the prism sheet. The optical sheet 28 may not include any of a diffusion sheet, a prism sheet, and a protecting sheet, and some may include a plurality of optical sheets. The optical sheet 28 may further include a reflective polarizing sheet capable of enhancing the luminance efficiency by separating, transmitting, and reflecting the polarized light component of light.

Among the frames 31 and 32 provided to stably fix the display panel 10 and the like, the frame 31 disposed in the light incident portion and the frame 32 disposed in the light facing portion may be different from each other in structure. The display panel 10 may be attached to the optical member 27 and the bracket 23 by adhesive members T1 and T2 such as a double-sided adhesive tape. The bracket 23 may be attached to the frame 32 by the adhesive member T3. By such a structure, the display device 1 may be designed to have a thin thickness.

Hereinabove, the entire configuration of the display device 1 has been described. Hereinafter, the optical member 27 of the light unit 20 in the display device 1 according to the exemplary embodiment will be described in detail. Hereinafter, reference will be made to the drawings referred to earlier without any particular reference.

Referring to FIG. 3, the optical member 27 includes a light guide 271 as a main constituent element for supplying light from the light source 242 to the display panel 10. In the light guide 271, the periphery adjacent to the light source 242 is called a light incident portion and the periphery disposed away from the light source 242 is called a light facing portion. The optical member 27 includes a low refractive index layer 273, a first capping layer 275, a wavelength conversion layer 276, a second capping layer 277, and an overcoat layer 278 that are sequentially stacked on the light guide 271.

The light guide 271 guides a proceeding path of light emitted from the light source 242. The light guide 271 may be a glass light guide. The glass light guide plate is less deformed by heat and moisture than a plastic light guide plate such as polymethyl methacrylate (PMMA), and has high strength. When the glass light guide is used, design freedom of the light unit 20 is increased such that a thinner light unit 20 and display device 1 can be provided. Silica-based glass may be used as a glass material of the light guide 271, and the light guide may include silicon dioxide ($SiO_2$), aluminum oxide ($Al_2O_3$), and the like as main components.

The light guide 271 may have a thickness of about 0.5 mm to about 3 mm, but may have a thickness of less than 0.5 mm or greater than 3 mm.

The light guide 271 according to the exemplary embodiment may include a metal oxide. In this case, the metal may include at least one of Fe, Ti, Co, Cr, Zn, Zr, Sn, V, Mg, Al, Sr, Mn, Cu, and Ni. An amount of metal oxide included in the light guide 271 may be about 0.02 at % to about 0.05 at %.

The metal oxide according to the exemplary embodiment may include a first metal oxide and a second metal oxide. The first metal oxide may be transparent, and the second metal oxide may have a predetermined color. The second metal oxide may have any color, and for example, may be yellow, green, purple, and the like.

An amount of the first metal oxide included in the light guide 271 may be larger than that of the second metal oxide. The light guide 271 may include the second metal oxide which has a predetermined color, but may be transparently visible since it contains more transparent first metal oxide.

The first metal oxide and the second metal oxide according to the exemplary embodiment may include the same metal. The first metal oxide ($M_AO_x$) and the second metal oxide ($M_BO_y$) may include the same metal, but may represent different colors depending on a metal ion state. In the ($M_AO_x$) and ($M_BO_y$), M may be one metal, and A, B, x, and y may be different real numbers. For example, when the first metal oxide includes a divalent metal ion and the second metal oxide includes a trivalent metal ion, each metal oxide may represents a different color even though they are the same metal.

Specifically, the first metal oxide is selected from the group consisting of divalent manganese, divalent titanium, tetravalent titanium, pentavalent titanium, tetravalent chromium, pentavalent chromium, trivalent to hexavalent manganese, tetravalent to hexavalent iron, tetravalent to pentavalent cobalt, trivalent to tetravalent nickel, trivalent copper, divalent zinc, and the like. In addition, the second metal oxide includes, for example, trivalent titanium, divalent to pentavalent vanadium, divalent to trivalent chromium, divalent manganese, divalent to trivalent iron, divalent to trivalent cobalt, divalent nickel, divalent copper, and the like. However, it should be understood that the first metal oxide and the second metal oxide are not limited to the above-described examples, but may include any metal that represents different colors depending on the metal ion.

The light guide 271 according to the exemplary embodiment may have transmittance of over about 60% with respect to light having a wavelength of 400 nanometers to 700 nanometers with respect to a direction D1, that is, a long side direction of one side of the light guide 271, and may be for example, over 70%. That is, when transmittance in a direction perpendicular to a side surface of the light guide 271 is measured, the transmittance with respect to light of 400 nanometers to 700 nanometers may be over about 60%, or may be over about 70%. Since the light guide 271 may include a relatively large amount of the first metal oxide in a transparent state than the second metal oxide having a predetermined color, even when transmittance is measured with respect to a narrow side rather than a wide side, transmittance may be excellent with respect to light of having a wavelength of 400 nanometers to 700 nanometers.

A pattern sheet 272 is disposed below the light guide 271, and the low refractive index layer 273 having a lower refractive index than the light guide 271 is disposed above the light guide 271. The refractive index of the pattern sheet 272 may be the same as that of the light guide 271. The low refractive index layer 273 may include a material having a lower refractive index than a material included in the light guide 271. The low refractive index layer 273 may include an organic material such as acrylic resin, polystyrene, polycarbonate, polyethylene terephthalate, and polyacrylonitrile, and may be coated on an upper surface of the light guide 271. Depending on exemplary embodiments, the low refractive index layer 273 may include particles such as hollow silica dispersed in the resin.

A first interface having a refractive index difference is formed between the low refractive index layer 273 and the light guide 271. The first interface corresponds to a light emission surface OS of the light guide 271, and functions as an interface through which light L guided in the light guide 271 is selectively emitted. When an incident angle formed by the light L1 guided in the light guide 271 and the light emission surface OS exceeds a threshold angle, the light L1 is fully reflected in the first interface and then returns to the light guide 271. On the other hand, when the incident angle of the light L2 or L3 guided in the light guide 271 to the light emission surface OS is less than a threshold angle at which total reflection occurs, at least a part of the light L2 or L3 passes through the first interface and is then leaked from the light guide 271.

An air layer is formed below the pattern sheet 272, and a second interface having a refractive index difference is formed between the pattern sheet 272 and the air layer. A reflection angle of the light L1 guided in the light guide 271 is controlled by patterns of the pattern sheet 272. The light L2 or L3 reflected or scattered by the second interface is not totally reflected at the first interface, and at least part of the light L2 or L3 can be leaked from the light guide 271. The pattern sheet 272 may be omitted, and instead, a bottom surface of the light guide 271 may be patterned.

The light L1 incident on a light inlet surface IS of the light guide 271 as described above is leaked through a light outlet surface OS of the light guide 271 while being guided in the light guide 271 until reaching the light facing portion from the light incident portion. The light guide 271 converts light having an optical distribution in the form of a point light source or a linear light source generated by the light source 242 into light having an optical distribution in the form of a surface light source.

Depending on exemplary embodiments, the optical member 27 may further include a reflective layer RL. The reflective layer RL may cover side surfaces of the light facing portion of the light guide 271 to prevent leakage of light guided in the light guide 271 through the side surfaces of the light facing portion of the light guide 271.

The first capping layer 275 and the wavelength conversion layer 276 are disposed on the low refractive index layer 273. The first capping layer 275 is essentially disposed between the wavelength conversion layer 276 and the low refractive index layer 273 to prevent the organic material of the wavelength conversion layer 276 and the organic material of the low refractive index layer 273 from being mixed. The first capping layer 275 may serve to prevent permeation of moisture or oxygen into the wavelength conversion layer 276.

The first capping layer 275 may be formed by depositing an inorganic material such as a silicon nitride ($SiN_x$), a silicon oxide ($SiO_x$), and the like through plasma assisted chemical vapor deposition (PECVD).

The wavelength conversion layer 276 is disposed on the first capping layer 275. The wavelength conversion layer 276 may be formed by coating a composition in which quantum dots QD are dispersed in a dispersion medium such as a resin on the first capping layer 275. Thus, the wavelength conversion layer 276 may be formed such that the quantum dots QD are dispersed in a resin layer. As a dispersion medium, a transparent material having low light absorption, while not affecting a wavelength conversion performance of the quantum dot QD, and for example, epoxy, silicone, polystyrene, acrylate, and the like, may be used.

When light emitted from the light source 242 is blue light, the quantum dots QD of the wavelength conversion layer 276 may include red quantum dots and green quantum dots. The red quantum dot converts a part of the blue light into red light having a wavelength of 620 nanometers to 750 nanometers, and the green quantum dot converts a part of the blue light into green light having a wavelength of 495 nanometers to 570 nanometers. The blue light not converted into the red light and the green light directly transmits through the wavelength conversion layer 276. The optical member 27 may provide white light to the display panel 10 by mixing of blue light, red light, and green light emitted from the wavelength conversion layer 276.

The second capping layer 277 is disposed on the wavelength conversion layer 276, and the overcoat layer 278 is disposed on the second capping layer 277. The second capping layer 277 may include an inorganic material such as a silicon nitride, a silicon oxide, and the like. The overcoat layer 278 may include an organic material. The second capping layer 277 can prevent the organic material of the wavelength conversion layer 276 and the organic material of the overcoat layer 278 from mixing. The second capping layer 277 can prevent permeation of moisture or oxygen. The overcoat layer 278 may protect the entire optical member 27.

The light guide 271 according to the exemplary embodiment may maintain transparency and transmittance of the light guide 271 by including a large amount of a transparent metal oxide, and can provide uniform display quality by preventing luminance change according to driving of the display device.

Figure 4:
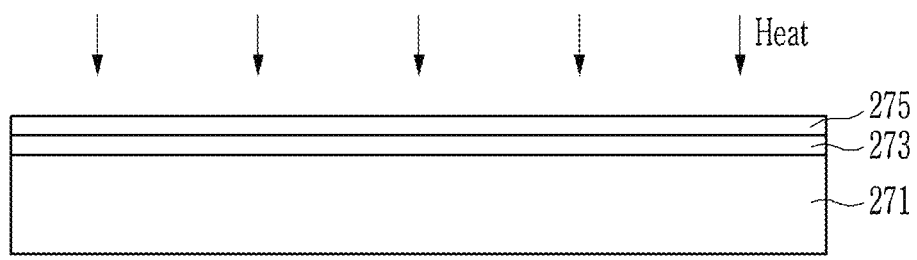
FIG. 4 shows a thermal treatment process carried out on an optical member.
Figure 5:
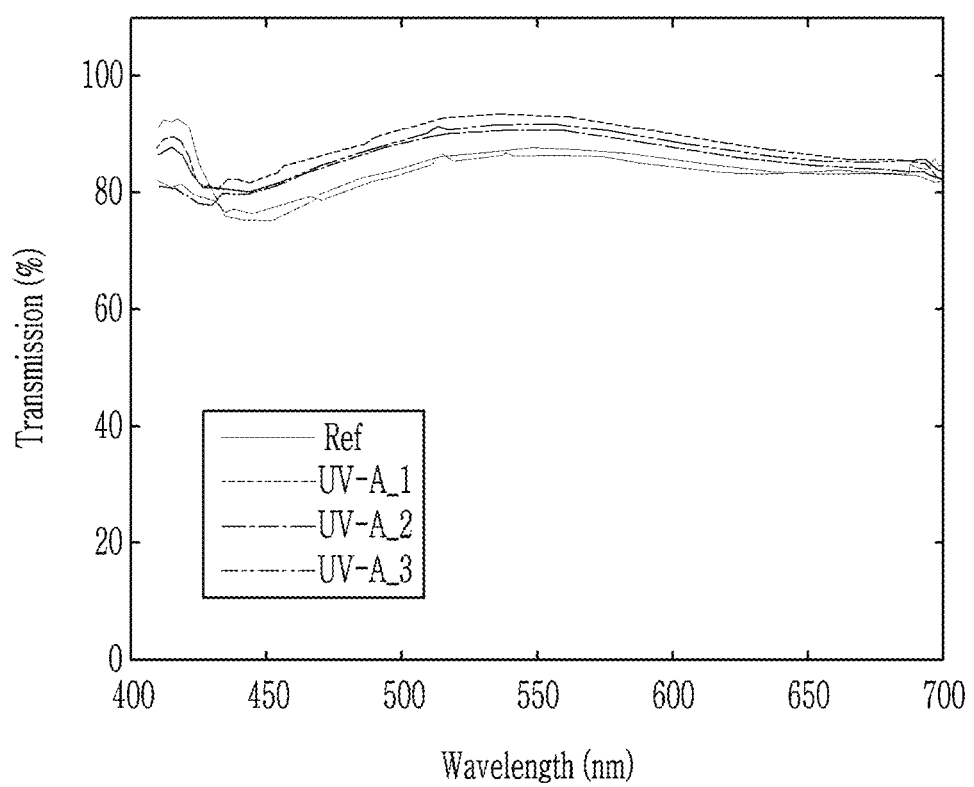
FIG. 5 is a transmittance graph of a case in which UV-A is irradiated to a light guide.
Figure 6:
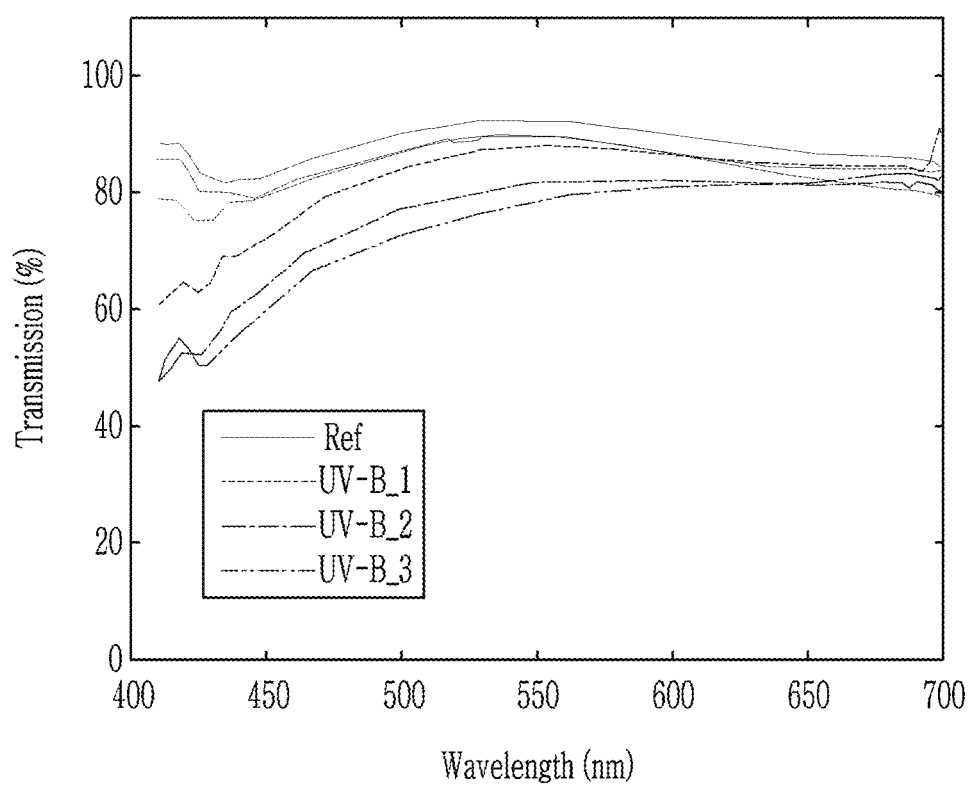
FIG. 6 is a transmittance graph of a case in which UV-B is irradiated to the light guide.
Figure 7:
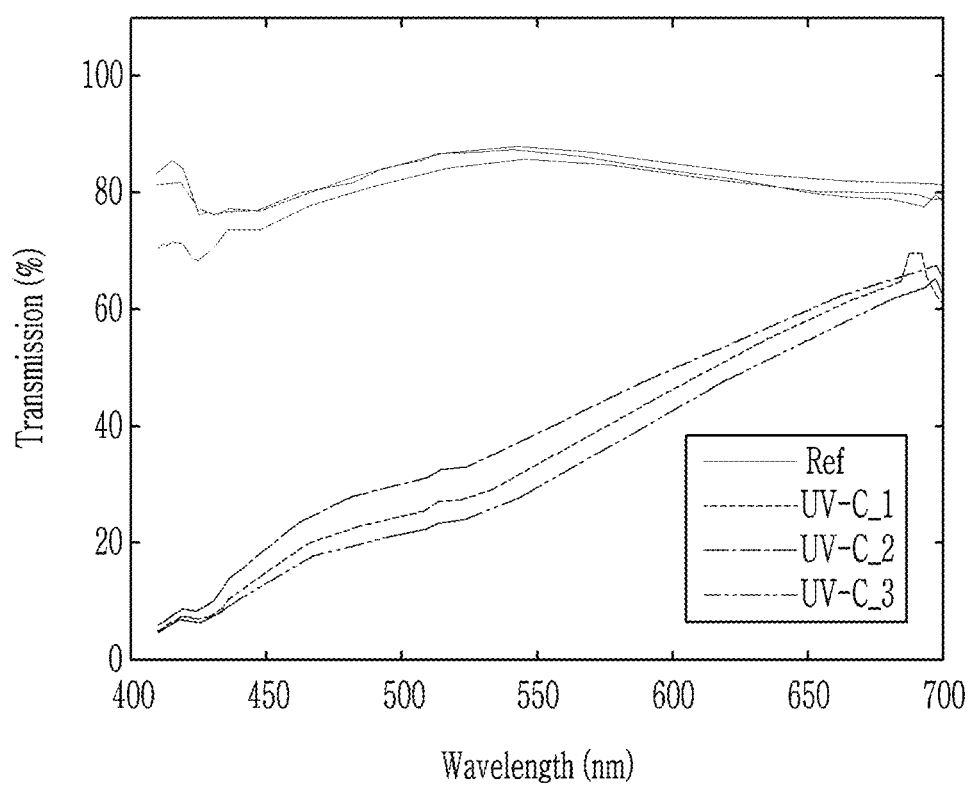
FIG. 7 is a transmittance graph of a case in which UV-C is irradiated to the light guide.

Hereinafter, a method for manufacturing a light unit according to an exemplary embodiment will be described with reference to FIG. 4 to FIG. 7. FIG. 4 shows a thermal treatment process carried out on an optical member, FIG. 5 is a transmittance graph of a case in which UV-A is irradiated to a light guide, FIG. 6 is a transmittance graph of a case in which UV-B is irradiated to the light guide, and FIG. 7 is a transmittance graph of a case in which UV-C is irradiated to the light guide. Hereinafter, the manufacturing method of the light guide in the optical member will be described in detail, and the other components may be manufactured by a method which is obvious to a person skilled in the art.

First, a light guide 271 made of a glass material is prepared. Next, a low refractive index layer 273 having an organic material is formed on the light guide 271, and a first capping layer 275 including an inorganic material is formed on the low refractive index layer 273.

Subsequently, a process for thermally processing the light guide 271 may be carried out. Specifically, the light guide 271 may be thermally treated while the low refractive index layer 273 and the first capping layer 275 are stacked on the light guide 271.

The thermal treatment process for the light guide 271 may be carried out at a temperature of about 150° C. to about 350° C. The thermal treatment process for the light guide 271 may be carried out for about 10 minutes to about 100 minutes.

Depending on a heat resistance temperature of the low refractive index layer 273, a temperature of the thermal treatment process of the light guide 271 may be determined.

For example, when the heat resistance temperature of the low refractive index layer 273 is over 350° C., the heat treatment process may be carried out at any temperature within the stated temperature range, and for example, may be carried out at a relatively high temperature. When the heat treatment process is performed at a relatively high temperature, the heat treatment process time may be shortened.

For example, when the heat resistance temperature of the low refractive index layer 273 is 200° C. or less, the heat treatment process of the light guide 271 may be carried out at about 150° C. to about 200° C. When the heat treatment process is carried out at a relatively low temperature, the heat treatment process time may be increased. As the temperature of the heat treatment process for the light guide 271 increases, the heat treatment process time may decrease.

When the first capping layer 275 is formed after forming the low refractive index layer 273 on the light guide 271 according to the exemplary embodiments, the light guide 271 may be able to represent a predetermined color and transmittance of the light guide 271 may be deteriorated.

Specifically, a plasma-assisted chemical vapor deposition (PECVD) process may be used when the first capping layer 275 is formed. When the first capping layer 275 may include, for example, a silicon nitride, the PECVD process may use a $SiH_4$, $NH_3$, and $N_2$ reaction gas. When the first capping layer 275 may include, for example, a silicon oxide, a $SiH_4$ and $N_2O$ reaction gas may be used.

A reaction gas existing in a reaction chamber of the PECVD process may be decomposed into a radical state by plasma energy. While the reaction gas is decomposed into the radical state, light of various wavelengths between about 100 nanometers and about 500 nanometers may be emitted.

Among lights of such various wavelengths, light having a wavelength of about 400 nanometers or less may cause a state of a metal oxide included in the light guide 271 to be changed. This will be specifically described with reference to FIG. 5 to FIG. 7.

Referring to FIG. 5, when UV-A was irradiated to the light guide 271 with different irradiation energy, no significant change occurred in transmittance of the light guide 271 compared to before the irradiation of light of the UV-A wavelength (Ref). As shown in FIG. 6, when UV-B was irradiated to the light guide 271 with different irradiation energy, no significant change occurred in transmittance of the light guide 271 in a visible light wavelength band compared to before the irradiation of light of UV-A wavelength, but transmittance of the light guide 271 was significantly decreased in a wavelength of about 450 nm or less. However, as shown in FIG. 7, when UV-C was irradiated to the light guide 271 with different irradiation energy, the transmittance of the light guide 271 was significantly decreased at a wavelength of 400 nanometers to 700 nanometers. That is, transmittance of the light guide 271 was decreased by a wavelength that corresponds to UV-C. For reference, according to the International Commission on Illumination (CIE), ultraviolet light is divided into UV-A at 315-380 nm, UV-B at 280-315 nm, and UV-C at 100-280 nm.

That is, a transparent first metal oxide ($M_AO_x$) included in the light guide 271 may be changed to a second metal oxide ($M_BO_y$) by the UV-B and UV-C wavelengths, and accordingly, transmittance of the light guide 271 is deteriorated while the light guide 271 represents a predetermined color.

However, in the method of manufacturing the light unit according to the embodiment, the second metal oxide ($M_BO_y$) that represents a predetermined color is changed again to the first metal oxide ($M_AO_x$) by performing the heat treatment process on the light guide 271 which has undergone the PECVD process. Accordingly, the light guide 271 included in the optical member of the exemplary embodiment may be provided in a transparent state.

Specifically, the light guide 271 before undergoing the PECVD process may include the first metal oxide ($M_AO_x$) and the second metal oxide ($M_BO_y$), and the amount of the first metal oxide ($M_AO_x$) may be greater than that of the second metal oxide ($M_BO_y$). However, when the PECVD process is carried out, the first metal oxide ($M_AO_x$) may be changed to the second metal oxide ($M_BO_y$) by UV-B and UV-C wavelengths generated during the process. Accordingly, the light guide 271 may represent a predetermined color by the second metal oxide during the manufacturing process. As described above, a light-guiding property of the light guide 271 including the colored second metal oxide may be decreased, and accordingly, the amount of light emitted through the light guide 271 may decrease and brightness of the display device may decrease.

According to the exemplary embodiment, when the thermal treatment is carried out on the light guide 271, the second metal oxide ($M_BO_y$) included in the light guide 271 can be changed again to the first metal oxide ($M_AO_x$). Thus, the light guide 271 according to the exemplary embodiment includes a large amount of the transparent first metal oxide ($M_AO_x$), and accordingly, the light guide 271 may be transparent. The optical member using such a light guide 271 may have an excellent light guiding property, and accordingly, the display device including the same may maintain constant luminance.

Figure 8:
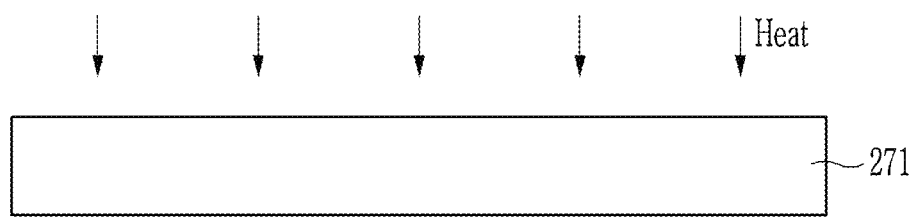
FIG. 8 is a cross-sectional view of a light guide in a manufacturing method of an exemplary embodiment.

Next, referring to FIG. 8, a method for manufacturing a light unit according to an exemplary embodiment will be described. FIG. 8 is a cross-sectional view of a light guide in a manufacturing method of an exemplary embodiment.

As shown in FIG. 8, a method for manufacturing a light unit according to an exemplary embodiment may include a step for preparing a light guide 271 and carrying out a thermal treatment on the prepared light guide 271.

The thermal treatment process of the light guide 271 may be carried out at a temperature of about 150° C. to about 350° C. The thermal treatment process of the light guide 271 may be carried out for about 10 minutes to about 100 minutes.

Since no additional layer is stacked on the light guide 271 in the exemplary embodiment, there is no limitation of the process temperature. The thermal treatment process according to the exemplary embodiment may be carried out at a relatively high temperature within the above-stated temperature range, and may be carried out, for example, at 310° C. to 330° C. In this case, the heat treatment process time may be within about 10 minutes to about 30 minutes.

Next, a low refractive index layer and a first capping layer are sequentially formed on the light guide 271 such that the optical member 27 described with reference to FIG. 3 can be provided.

According to the exemplary embodiment, the light guide 271 may maintain a transparent state even when a PECVD process is carried out to form the first capping layer after performing the thermal treatment process to the light guide 271.

The light guide 271 before the heat treatment process may include both of the first metal oxide ($M_AO_x$) and the second metal oxide ($M_BO_y$). When the thermal treatment process is performed according to the exemplary embodiment, the second metal oxide ($M_BO_y$) may be changed to the first metal oxide ($M_AO_x$) by thermal energy. That is, the light guide 271 after the thermal treatment process may include most of the first metal oxide ($M_AO_x$) and a small amount of the second metal oxide ($M_BO_y$). Thus, although the PECVD process is carried out on the light guide 271 which has undergone the thermal treatment process and thus the first metal oxide ($M_AO_x$) is partially changed to the second metal oxide ($M_BO_y$), a content of the first metal oxide ($M_AO_x$) may be larger than that of the second metal oxide ($M_BO_y$). Thus, when the manufacturing method of the exemplary embodiment is used, the light guide 271 may maintain a transparent state even after the PECVD process is carried out on the light guide 271.

Figure 9:
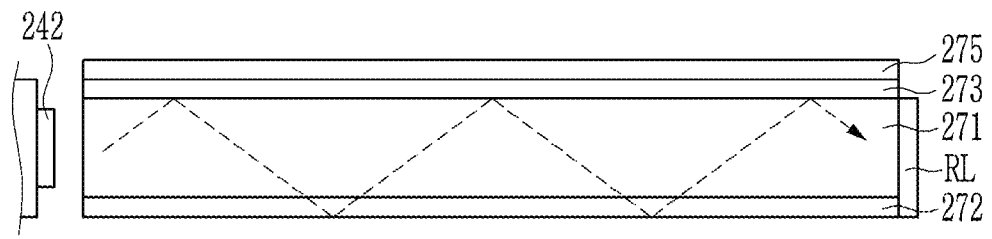
FIG. 9 and FIG. 10 are cross-sectional views of some constituent elements of an optical member in a method for manufacturing a light unit according to an exemplary embodiment.
Figure 10:
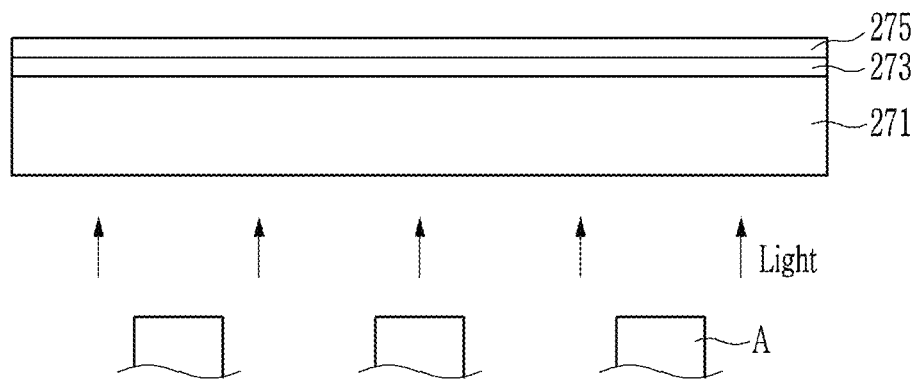

Hereinafter, a method for manufacturing a light unit according to an exemplary embodiment will be described with reference to FIG. 9 and FIG. 10. FIG. 9 and FIG. 10 are cross-sectional views of some constituent elements of an optical member in a method for manufacturing a light unit according to an exemplary embodiment.

Referring to FIG. 9, a light guide 271 made of a glass material is prepared. Then, a low refractive index layer 273 including an organic material is formed on the light guide 271, and a first capping layer 275 including an inorganic material is formed on the low refractive index layer 273.

When the first capping layer 275 is formed, a PECVD process may be used. When the first capping layer 275 includes, for example, a silicon nitride, the PECVD process may use a $SiH_4$, $NH_3$, and $N_2$ reaction gas. When the first capping layer 275 includes, for example, a silicon oxide, a $SiH_4$ and $N_2O$ reaction gas may be used.

A reaction gas existing in a reaction chamber of the PECVD process may be decomposed into a radical state by plasma energy. While the reaction gas is decomposed into the radical state, light of various wavelengths between about 100 nanometers to about 500 nanometers may be emitted. Among lights of such various wavelengths, light having a wavelength of about 400 nanometers or less may cause a state of the metal oxide included in the light guide 271 to be changed. The light guide 271 after the PECVD process is carried out may represent a predetermined color, and may represent, for example, yellow.

Meanwhile, a pattern sheet 272 is formed at a bottom surface of the light guide 271, a light reflection layer RL is formed at a side surface of the light guide 271, and then a light source 242 included in a display device is prepared.

Next, the light source 242 is driven to irradiate light to the light guide 271. The light source 242 may emit light of, for example, blue, and the blue light may be light having a wavelength of about 440 nanometers to about 485 nanometers. The light source 242 may emit light of blue having a peak wavelength of, for example, 445 nanometers to 450 nanometers, particularly, blue light having a peak wavelength of 447 nanometers.

The second metal oxide ($M_BO_y$) representing a predetermined color by the light emitted from the light source 242 may be changed again to the first metal oxide ($M_AO_x$). The light guide 271 undergone light irradiation may be changed again to a transparent state. In this case, light emitted from the light source 242 may effectively move in the light guide 271 by the pattern sheet 272 and the reflection layer RL.

A content of the first metal oxide ($M_AO_x$) included in the light guide 271, which has undergone the light irradiation, may be greater than a content of the second metal oxide ($M_BO_y$). Since the light guide 271 may include a relatively large amount of the first metal oxide in a transparent state than the second metal oxide having a predetermined color, the light guide 271 may be seen as transparent.

The light guide 271, which has undergone the light irradiation, may have transmittance of over about 60% with respect to light having a wavelength of 400 nanometers to 700 nanometers with respect to a direction D1, that is, a long side direction of one side of the light guide 271, and may be, for example, over 70%. That is, when transmittance in a direction perpendicular to a side surface of the light guide 271 is measured, the transmittance with respect to light of 400 nanometers to 700 nanometers may be over about 60%.

Next, referring to FIG. 10, a light guide 271 made of a glass material is prepared. Then, a low refractive index layer 273 including an organic material is formed on the light guide 271, and a first capping layer 275 including an inorganic material is formed on the low refractive index layer 273.

The first capping layer 275 may be formed by using a PECVD process, and the light guide 271 after the PECVD process is carried out may represent a predetermined color as described above.

Next, light may be irradiated to the light guide 271 by using an additional light source A. The light may have a wavelength of about 400 nanometers to about 700 nanometers. The light irradiation may be carried out over about 24 hours.

The second metal oxide ($M_BO_y$) representing a predetermined color by the light emitted from the light source A may be changed again to the first metal oxide ($M_AO_x$). The light guide 271 having undergone the light irradiation may be changed again into a transparent state.

A content of the first metal oxide ($M_AO_x$) having undergone the light irradiation may be greater than a content of the second metal oxide ($M_BO_y$). Since the light guide 271 may include a relatively larger amount of the first metal oxide in a transparent state than the second metal oxide having a predetermined color, the light guide 271 may be transparent.

The light guide 271, which has undergone the light irradiation, may have transmittance of over about 60% with respect to light having a wavelength of 400 nanometers to 700 nanometers with respect to a direction D1, that is, a long side direction of one side of the light guide 271, and may be, for example, over 70%. That is, when transmittance in a direction perpendicular to a side surface of the light guide 271 is measured, the transmittance with respect to light of 400 nanometers to 700 nanometers may be over about 60%.

The present specification describes an exemplary embodiment in which a light irradiation process is carried out in a state in which a low refractive index layer 273 and a first capping layer 275 are stacked on the light guide 271, but is not limited thereto, and it is also possible to form the low refractive index layer 273 and the first capping layer 275 after carrying out the light irradiation process on the light guide 271.

Figure 11:
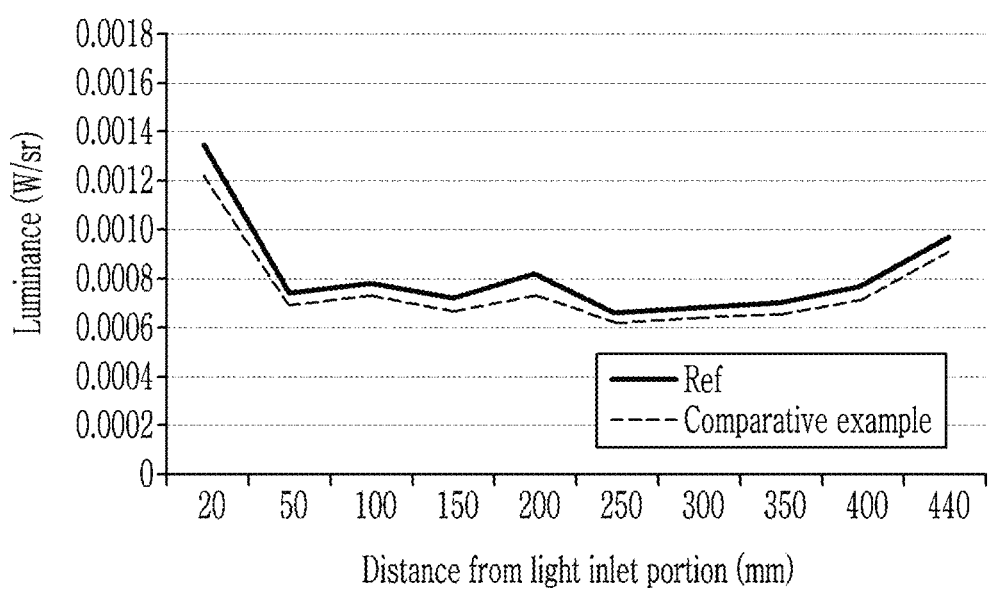
FIG. 11 is a graph that shows luminance of an optical member that includes a light guide according to the exemplary embodiment.

Hereinafter, an exemplary embodiment and a comparative example will be described with reference to FIG. 11 to FIG. 13. FIG. 11 is a graph that shows luminance of an optical member that includes a light guide according to the exemplary embodiment, FIG. 12 is a graph that shows luminance of an optical member that includes a light guide according to a comparative example, and FIG. 13 is a graph that shows a luminance increase rate when the optical members according to the exemplary embodiments and the comparative examples are used.

First, referring to FIG. 11, when a thermal treatment process is carried out or a light irradiation process is carried out on a light guide according to the exemplary embodiment, a display device according to the exemplary embodiment has substantially the same luminance as that of a display device (Ref) in an initial driving state even after a PECVD process is carried out on the light guide. Since the display device (Ref) in the initial driving state includes a light guide in a transparent state, it was determined that luminance of the display device was constantly maintained even after time passes.

Figure 12:
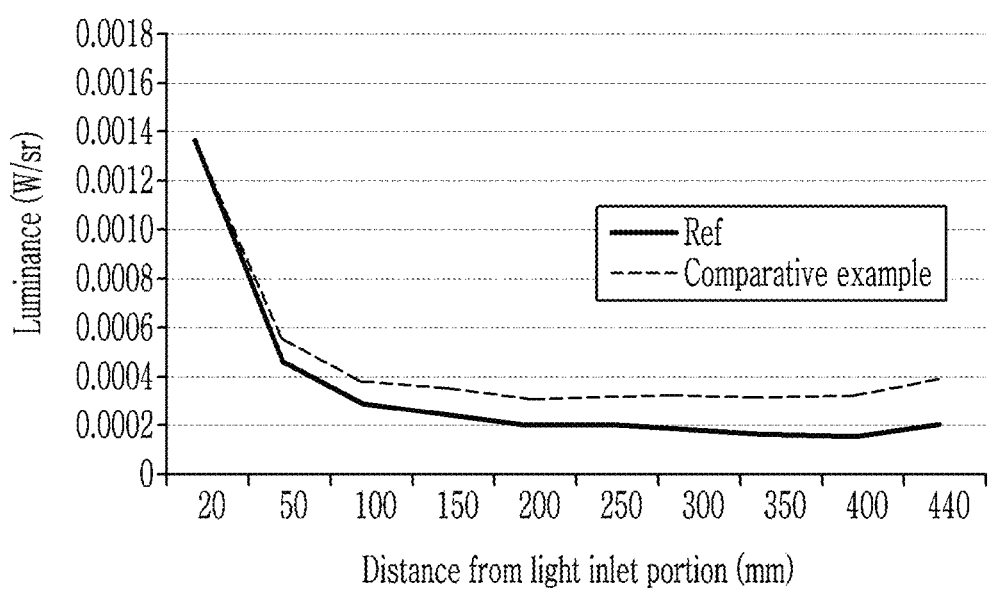
FIG. 12 is a graph that shows luminance of an optical member that includes a light guide according to a comparative example.
Figure 13:
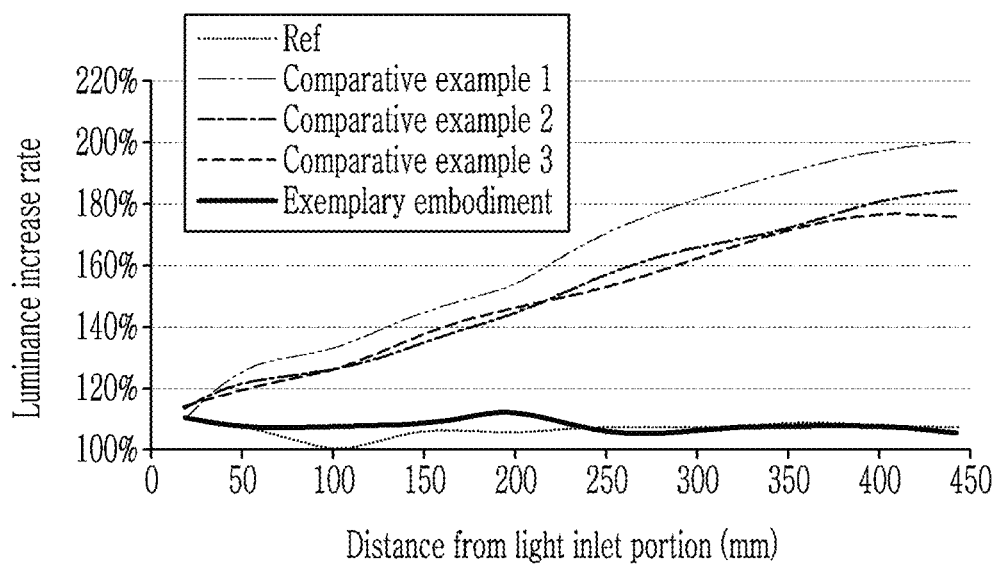
FIG. 13 is a graph that shows a luminance increase rate when the optical members according to the exemplary embodiments and the comparative examples are used.

On the other hand, referring to FIG. 12, when a thermal treatment process or a light irradiation process is not carried out on a light guide according to a comparative example, it was determined that luminance of a display device that includes a light guide on which a PECVD process was carried out was increased as time passes compared to the display device (Ref) in the initial driving state. The display device (Ref) of the initial driving state may include a light guide in which a relatively large content of the second metal oxide is included, and may represent a yellowish color. However, the light guide where irradiation of light emitted from a light source is carried out by driving of the device is changed again to a transparent state, and thus as shown in FIG. 12, luminance was increased.

The display device according to the comparative example causes a luminance change and thus display quality may not be uniform.

Next, referring to FIG. 13, a luminance increase rate with respect to an initial state after a predetermined time has passed was observed by irradiating light in a region corresponding to the light incident portion with each light guide. Ref indicates a case in which a transparent glass light guide is used, Comparative Example 1 is a case in which a light guide on which a PECVD process is carried out by using $N_2O$ gas at 180° C. is used, Comparative Example 2 is a case in which a light guide on which the PECVD process is carried out by using $N_2O$ gas at 320° C. and $N_2O$ gas at 180° C. is used, Comparative Example 3 is a case in which a light guide on which the PECVD process is carried out by using $N_2$ and $NH_3$ gas at 320° C. and $N_2O$ gas at 180° C. is used, and an exemplary embodiment is a case in which a light guide on which the PECVD process is carried out by using $N_2O$ gas at 180° C. after carrying out a thermal treatment process.

In case of the exemplary embodiment, the light guide could maintain transparency by the thermal treatment process even through the PECVD process was carried out on the light guide. As a result, it was determined that even when a predetermined time elapses in the initial driving state, the same luminance can be exhibited.

Meanwhile, when the reaction gas used in the PECVD process is changed or the process temperature is changed, a content of the second metal oxide may be greater than a content of the first metal oxide and may represent a predetermined color at the initial driving state according to Comparative Example 1 and Comparative Example 2. Thus, when light is irradiated in the light incident portion for a predetermined time period, the second metal oxide was changed again to the first metal oxide in the transparent state and thus the light guide also became transparent, and accordingly, the luminance increase rate was increased up to 200%. Driving of the display device caused luminance change and deterioration of uniformity in display quality.

Figure 14:
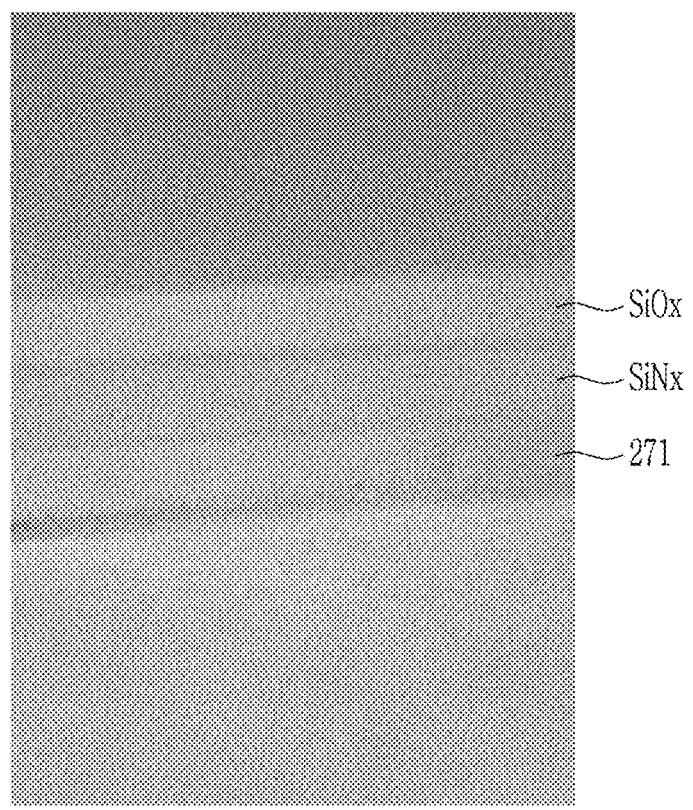
FIG. 14 shows an image of an exemplary embodiment in which an inorganic layer is formed by using a PECVD process on a light guide and then thermal treatment is carried out thereon.
Figure 15:
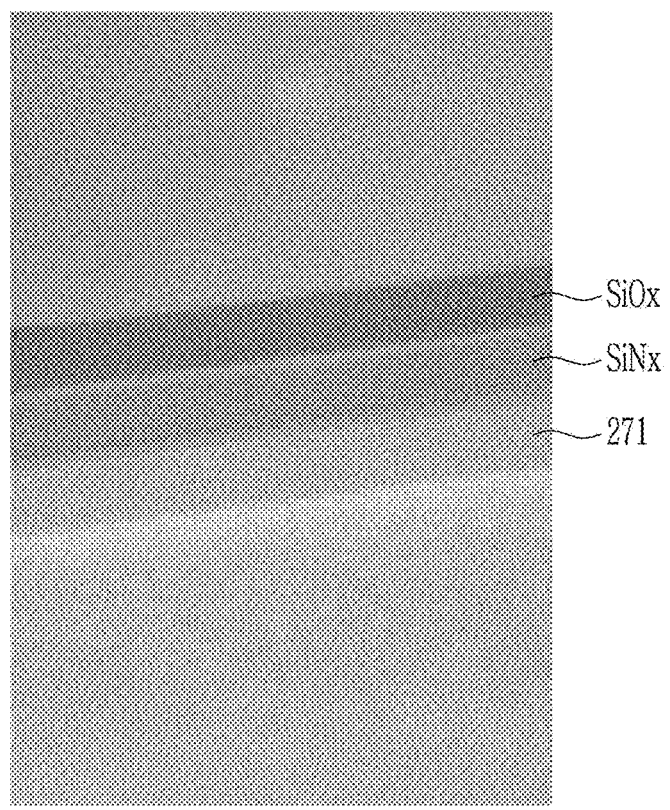
FIG. 15 is an image of the exemplary embodiment in which the thermal treatment is carried out at a low temperature.

Hereinafter, transparency of a light guide on which a thermal treatment process is carried out according to an exemplary embodiment will be described with reference to FIG. 14 and FIG. 15. FIG. 14 shows an image of an exemplary embodiment in which an inorganic layer is formed by using a PECVD process on a light guide and then thermal treatment is carried out thereon, and FIG. 15 is an image of the exemplary embodiment in which the thermal treatment is carried out at a low temperature.

First, an inorganic layer including a silicon oxide (SiNx) and an inorganic layer including a silicon oxide (SiOx) were formed on a light guide 271, which is made of a glass material, and then a thermal treatment process was carried out at 320° C. for 10 minutes. When a PECVD process was performed, the glass-material light guide 271 may represent a yellowish color, and as a result of performing the thermal treatment process as in the exemplary embodiment, the light guide 271 was in a transparent state as shown in FIG. 14.

Next, an inorganic layer including a silicon oxide (SiNx) and an inorganic layer including a silicon oxide (SiOx) were formed on the glass-material light guide 271, and then a thermal treatment process was carried out at 190° C. for 90 minutes. When the PECVD process was performed as described with reference to FIG. 14, the glass-material light guide 271 may represent a yellowish color, and as a result of performing the thermal treatment process as in the exemplary embodiment, the light guide 271 was in a transparent state as shown in FIG. 15.

Some of the advantages that may be achieved by exemplary embodiments of the invention and/or exemplary methods of the invention include a light unit having an improved optical property, a method for manufacturing the light unit, and a display device including the light unit can be provided. In particular, it is possible to provide a light unit in which luminance of a light facing portion does not change or hardly changes even after a lapse of time Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A light unit comprising:
a light source; and
an optical member that transmits and converts light emitted from the light source,
wherein the optical member comprises:
a light guide;
a low refractive index layer that is disposed on the light guide and has a lower refractive index than that of the light guide;
a first capping layer that is disposed on the low refractive index layer; and
a wavelength conversion layer that is disposed on the first capping layer and includes quantum dots, and
the light guide includes a metal oxide,
wherein the metal oxide comprises:
a transparent first metal oxide represented by $M_AO_X$; and
a second metal oxide that represents a predetermined color represented by $M_BO_Y$,
wherein A, B, X, and Y are real integers and the first metal oxide and the second metal oxide include the same metal M, and
wherein a content of the transparent first metal oxide is greater than a content of the second metal oxide based upon a thermal treatment of the light guide changing at least a portion of the second metal oxide to the first metal oxide.

2. The light unit of claim 1, wherein the transparent metal oxide comprises at least one of Fe, Ti, Co, Cr, Zn, Zr, Sn, V, Mg, Al, Sr, Mn, Cu, and Ni.

3. The light unit of claim 1, wherein the light guide has transmittance of over 70% within a wavelength range of 400 nm to 700 nm with respect to a direction that is perpendicular to a side surface of the light guide.

4. The light unit of claim 1, wherein the optical member further comprises a second capping layer that is disposed on the wavelength conversion layer, and
the first capping layer and the second capping layer comprise an inorganic material.

5. The light unit of claim 4, wherein the optical member further comprises an overcoat layer that is disposed on the second capping layer,
wherein the overcoat layer comprises an organic material.

6. A display device comprising:
a display panel; and
a light unit that supplies light to the display panel,
wherein the light unit comprises
a light source and
an optical member that transmits and converts light emitted from the light source,
the optical member comprises
a light guide,
a low refractive index layer that is disposed on the light guide and has a lower refractive index than that of the light guide, and
a first capping layer that is disposed on the low refractive index layer,
the light guide comprises a transparent first metal oxide represented by $M_AO_X$ and a second metal oxide represented by $M_BO_Y$ that represents a predetermined color, wherein A, B, X, and Y are real integers,
a content of the first metal oxide is greater than a content of the second metal oxide based upon a thermal treatment of the light guide changing at least a portion of the second metal oxide to the first metal oxide, and
the first metal oxide and the second metal oxide include the same metal M, and represent different colors depending on a metal ion.

7. The display device of claim 6, wherein the light guide has transmittance of over 70% within a wavelength range of 400 nm to 700 nm with respect to a direction that is perpendicular to a side surface of the light guide.

8. The display device of claim 6, wherein the first metal oxide and the second metal oxide comprise at least one of Fe, Ti, Co, Cr, Zn, Zr, Sn, V, Mg, Al, Sr, Mn, Cu, and Ni.

9. The display device of claim 6, wherein the optical member further comprises:
a wavelength conversion layer that is disposed on the first capping layer; and
a second capping layer that is disposed on the wavelength conversion layer and includes an inorganic material.

10. The display device of claim 9, wherein the optical member further comprises an overcoat layer that is disposed on the second capping layer, and the overcoat layer comprises an organic material.

* * * * *